United States Patent
Zhang et al.

(10) Patent No.: US 10,649,941 B2
(45) Date of Patent: May 12, 2020

(54) SERVER SYSTEM AND METHOD FOR MANAGING TWO BASEBOARD MANAGEMENT CONTROLLERS

(71) Applicants: INVENTEC (PUDONG) TECHNOLOGY CORPORATION, Shanghai (CN); INVENTEC CORPORATION, Taipei (TW)

(72) Inventors: Xi-Lang Zhang, Shanghai (CN); Guo-Xin Sun, Shanghai (CN); Jia-Ling Hu, Shanghai (CN); Li-Hong Huang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/135,738

(22) Filed: Sep. 19, 2018

(65) Prior Publication Data
US 2020/0057741 A1    Feb. 20, 2020

(30) Foreign Application Priority Data
Aug. 15, 2018 (CN) .......................... 2018 1 0931231

(51) Int. Cl.
  *G06F 13/38*   (2006.01)
  *G06F 21/85*   (2013.01)
  *G06F 13/40*   (2006.01)
  *G06F 13/362*  (2006.01)

(52) U.S. Cl.
  CPC ........ *G06F 13/4022* (2013.01); *G06F 13/362* (2013.01); *G06F 13/385* (2013.01); *G06F 13/4027* (2013.01); *G06F 13/4068* (2013.01)

(58) Field of Classification Search
  CPC .............................. G06F 13/385; G06F 21/85
  See application file for complete search history.

(56) References Cited

U.S. PATENT DOCUMENTS

| | | | |
|---|---|---|---|
| 2012/0030492 A1* | 2/2012 | Yu ........................... | G06F 1/206 713/324 |
| 2015/0117175 A1* | 4/2015 | Dharmadhikari ... | H04L 41/0659 370/216 |
| 2018/0188969 A1* | 7/2018 | Liu ........................ | G06F 3/0607 |
| 2018/0357193 A1* | 12/2018 | Zhan ..................... | G06F 13/404 |

* cited by examiner

*Primary Examiner* — Hyun Nam
(74) *Attorney, Agent, or Firm* — Maschoff Brennan

(57) ABSTRACT

A method for managing two baseboard management controllers comprises connecting to a first baseboard management controller, sending an instruction to the first baseboard management controller, determining whether the instruction comprises a bridge parameter, when the instruction comprises the bridge parameter, sending the instruction to a second baseboard management controller through a bus, generating a response signal by the second baseboard management controller, and receiving the response signal by the first baseboard management controller and sending the response signal to an administration interface; otherwise, executing a corresponding operation according to the instruction by the first baseboard management controller and sending an operation result to the administration interface.

5 Claims, 2 Drawing Sheets

SERVER SYSTEM AND METHOD FOR MANAGING TWO BASEBOARD MANAGEMENT CONTROLLERS

CROSS-REFERENCE TO RELATED APPLICATIONS

This non-provisional application claims priority under 35 U.S.C. § 119(a) on Patent Application 201810931231.2 filed in China on Aug. 15, 2018, the entire contents of which are hereby incorporated by reference.

TECHNICAL FIELD

The disclosure relates to a server system, more particularly to the server system and a method for managing two baseboard management controllers.

BACKGROUND

As the technology of the server grows completely, the configuration of the server chassis is flexible presently. For example, for a 4U chassis, wherein three units of it are allotted to display cards, and the other unit of it is allotted to the host. In other words, there are two separate mainboards in the 4U chassis, and each of the mainboards is managed and monitored by the baseboard management controller (BMC) thereof.

Because the display card lacks of a local interface, the present method to manage the display card by the baseboard management controller (BMC) is to perform via a network interface. However, if the network interfaces in the two mainboards are connected to the computer cables, costs in both the management and the network source are additionally increased. Moreover, this management mode also lacks of the whole set management.

SUMMARY

As the reasons mentioned above, this disclosure supplies a server system and a method for managing two baseboard management controllers, which is to solve the problem of setting the additional computer cables for managing the two baseboard management controllers.

According to an embodiment in this disclosure, a method for managing two baseboard management controllers is disclosed. The method is applied to the server system which comprises a first baseboard management controller, a second baseboard management controller and a bus, wherein the first baseboard management controller electrically connects to the second baseboard management controller by the bus. Additionally, this method comprises: connecting to the first baseboard management controller by an administration interface, and sending an instruction to the first baseboard management controller after connecting to the first baseboard management controller; in addition, the first baseboard management controller determines whether the instruction comprises a bridge parameter. Moreover, when the instruction includes the bridge parameter, the first baseboard management controller sends the instruction to the second baseboard management controller by the bus, and the second baseboard management controller generates a responding signal according to the instruction. Also, the first baseboard management controller receives the responding signal and sending the responding signal to the administration interface. However, when the instruction does not comprise the bridge parameter, the first baseboard management controller executes a corresponding operation according to the instruction, and the first baseboard management controller sends an operation result to the administration interface.

According to an embodiment in this disclosure, which is a method for managing two baseboard management controllers. The bus is a primary intelligent platform management interface bus (primary IPMB bus), and the administration interface connects to the first baseboard management controller by a local area network (LAN) or a keyboard controller style (KCS). Also, the administration interface is an intelligent platform management interface tool (IPMI-tool). When the instruction comprises the bridge parameter, the instruction further comprises an address of the second baseboard management controller, wherein the address of the second baseboard management controller is different from another address of the first baseboard management controller.

According to an embodiment in this disclosure, which is a server system, wherein the server system comprises: a first mainboard, a second mainboard, and a bus. The first mainboard comprises a first baseboard management controller and an external port; additionally, the external port communicatively connects to the local area network (LAN) or electrically connects to the keyboard controller style (KCS). The first baseboard management controller comprises a first internal port, and the external port communicatively connects to an external device; also, the external port receives an instruction sending from the external device. The second mainboard comprises a second baseboard management controller, wherein the second baseboard management controller comprises a second internal port. In addition, the bus comprises two sides, each of the two sides electrically connects to the first internal port and the second internal port; also, the bus is used for selectively sending the instruction from the first baseboard management controller to the second baseboard management controller. Moreover, the address of the first internal port which is on the inter-integrated circuit bus is different from the address of the second internal port which is on the inter-integrated circuit bus; also, each firmware code of the first baseboard management controller and the second baseboard management controller selects the inter-integrated circuit bus to a primary intelligent platform management interface bus (primary IPMB bus).

As the structure descripted above, this disclosure discloses the server system and the method for managing two baseboard management controllers. This disclosure disposes an inter-integrated circuit bus between the first baseboard management controller and the second baseboard management controller, and this disclosure also disposes the bus as a primary IPMB bus in the firmware code of the two baseboard management controllers; hence, this disclosure achieves the effect of managing the first baseboard management controller through the second baseboard management controller. In practice, this method can decrease the cost both in the management and the network source.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
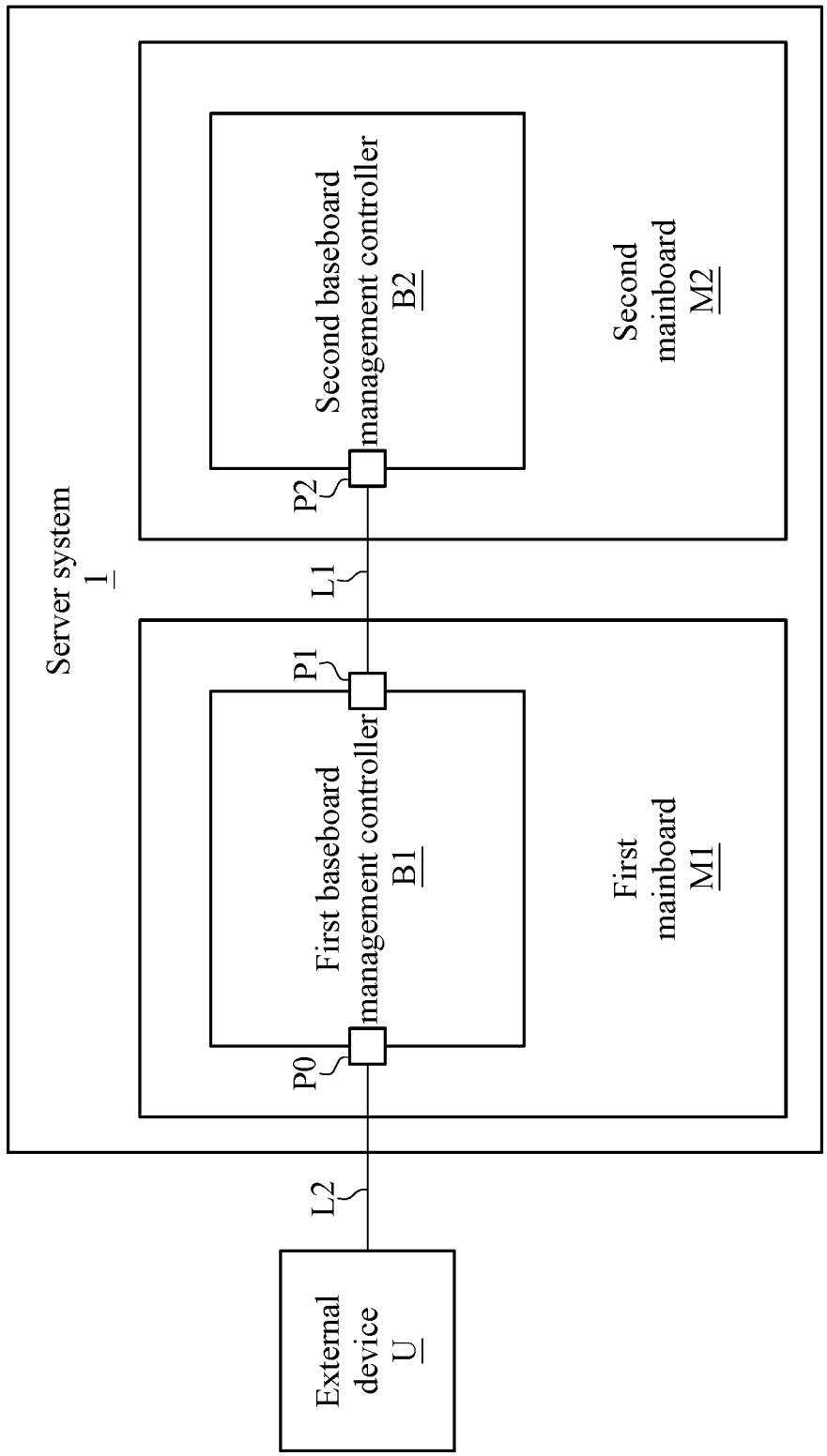
FIG. 1 is a structure diagram of the server system in an embodiment according to this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1. FIG. 1 is a structure diagram of the server system in an embodiment according to this disclosure. The server system 1 comprises a first mainboard M1 and a second mainboard M2, wherein the first mainboard M1 electrically connects to the second mainboard M2. In practice, the server system 1 is disposed on a chassis which includes a plurality of racks. The first mainboard M1 and the second mainboard M2 are disposed on different chassis respectively.

The first mainboard M1 comprises a first baseboard management controller B1 and an external port P0. The first baseboard management controller B1 comprises a first internal port P1. The external port P0 supplies an external connection L2 for communicatively or electrically connecting to an external device U as well as for receiving the instruction sent from the external device U through the external connection L2. Specifically, the external port P0 is configured to communicatively connect to the local area network (LAN) or electrically connect to the keyboard control style (KCS) interface. In practice, the first mainboard M1 can be a mainboard including a central processing unit (CPU) and works as a host of the server system 1.

The second mainboard M2 comprises a second baseboard management controller B2, and the second baseboard management controller B2 comprises a second internal port P2. In practice, the second mainboard M2 comprises a display card including a graphic processing unit (GPU). Furthermore, because the second mainboard M2 does not comprise a basic input/output system (BIOS), it is not able to turn on by itself. Thus, the second mainboard M2 must operate with the first mainboard M1.

Please refer to FIG. 1. The server system 1 descripted in an embodiment for this disclosure, wherein the first internal port P1 electrically connects to the second internal port P2. In practice, each of the first baseboard management controller B1 and the second baseboard management controller B2 can comprise a plurality of the internal ports. Additionally, based on the need, two suitable internal ports including one selected from the baseboard management controller B1 and one selected from the baseboard management controller B2 can be connected with each other.

In an embodiment of this disclosure, the first internal port P1 electrically connects to the second internal port P2 via an inter-integrated circuit bus L1 ($I^2C$), and the address of the first internal port P1 in the inter-integrated circuit bus L1 is different from the address of the second internal port P2 in the inter-integrated circuit bus L1. For example, normally, a slave address of the baseboard management controllers is 0x20. However, to the server system 1 descripted in an embodiment of this disclosure, for implementation of the communication between the first baseboard management controller B1 and the second baseboard management controller B2, the slave address of the second baseboard management controller B2 in the connective inter-integrated circuit L1 is adjusted to 0x24 so as to avoid any address conflict. For the first baseboard management controller B1, the second baseboard management controller B2 of the second mainboard M2 is a device with the address of 0x24 in the inter-integrated circuit L1; on the other hand, for the second baseboard management controller B2, the first baseboard management controller B1 of the first mainboard M1 is a device with the address of 0x20 in the inter-integrated circuit L1.

As the above descriptions, the inter-integrated circuit bus L1 is assigned as a primary intelligent platform management interface bus (primary IPMB bus) in each firmware code of the first baseboard management controller and the second baseboard management controller after the inter-integrated circuit L1 is set. Thus, the first baseboard management controller B1 and the second baseboard management controller B2 process the data as the IPMB data, wherein the data is transmitted via the inter-integrated circuit bus L1. Additionally, the data is assured to be transmitted steadily since the IPMB data is a further package form of the $I^2C$ data.

After the above configurations are deposed, the users are not only able to manage and visit the first baseboard management controller B1 in the conventional way, but also using the first baseboard management controller B1 as a bridge; for example, a common remote management tool (such as the IPMItool) may receive the feedback after sending the instruction to the second baseboard management controller B2 of the second mainboard M2.

Figure 2:
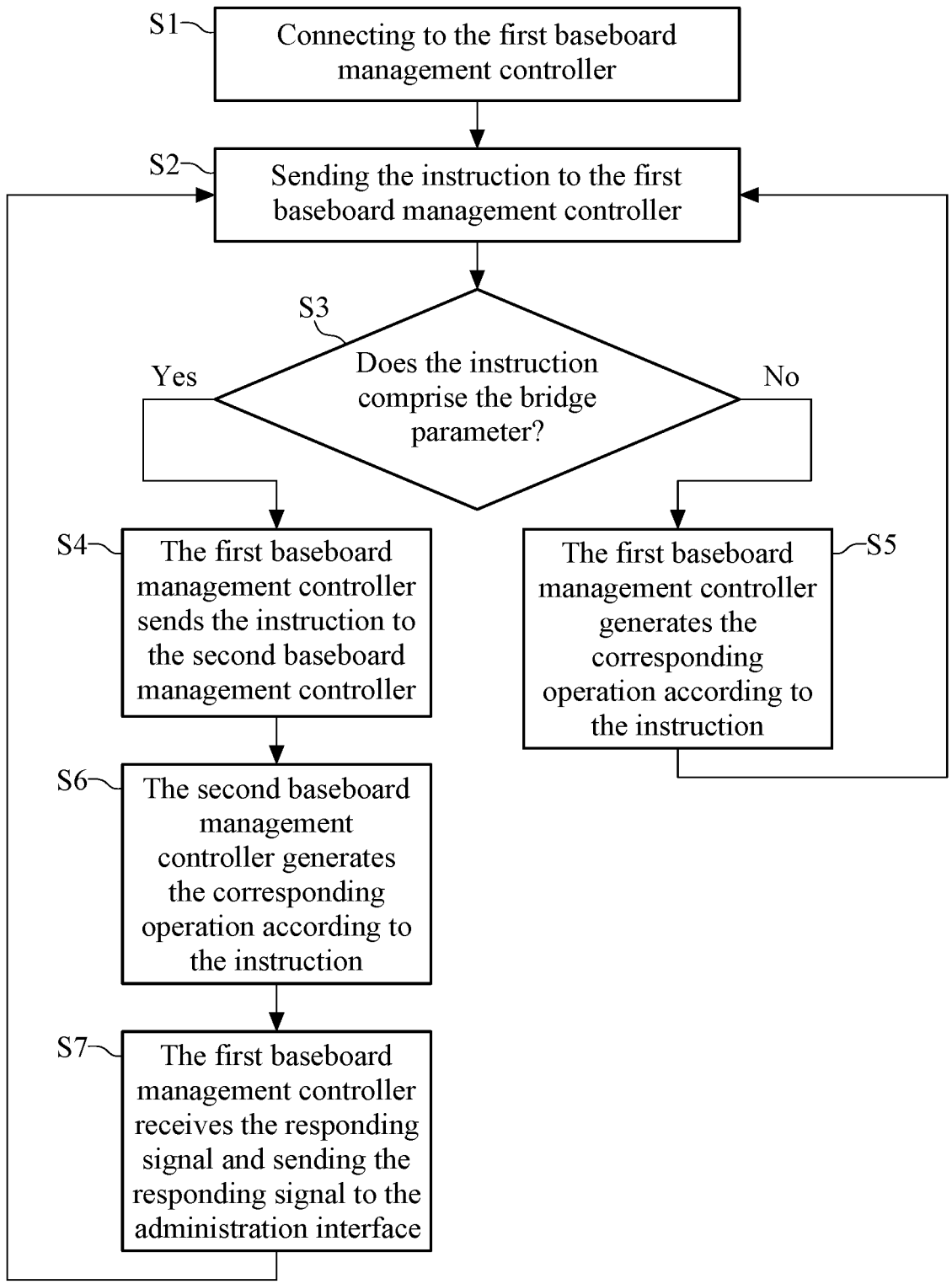
FIG. 2 is a flowchart of a method for managing two baseboard management controllers in an embodiment according to this disclosure.

Please refer to FIG. 2, which is a flowchart for managing two baseboard manage controllers in an embodiment according to this disclosure, and the method is suitable for the server system 1 descripted above.

Please refer to step S1, connecting to the first baseboard management controller B1, and also refer to the FIG. 1. In practice, the external device U is able to connect to the first mainboard M1 by the local area network (LAN) interface or the keyboard controller style (KCS) interface.

Please refer to step S2, sending the instruction to the first baseboard management controller B1. For detailed descriptions, the external device U is able to send the instruction to the IPMItool of the first baseboard management controller B1 and perform the corresponding operation. In addition, managing the IPMI of the server under the Linux system can be achieved through the IPMItool.

Please refer to step S3, determining the instruction comprises the bridge parameter. Specifically, the first baseboard management controller B1 checks whether the instruction includes a bridge parameter such as "-b" and whether the instruction includes the address of the second baseboard management controller B2 (0x24). If the instruction includes a bridge parameter such as "-b" and whether the instruction includes the address of the second baseboard management controller B2 (0x24), the process performs the step S4. In contrast, the process performs the step S5.

Please refer to step S4, wherein the first baseboard management controller B1 sends the instruction to the second baseboard management controller B2. After the step S3, when the first baseboard management controller B1 determines the instruction from the external device U is used for controlling the second baseboard management controller B2, the first baseboard management controller B1 encapsulates the instruction as the intelligent platform management interface (IPMB) data format and sends the instruction to the second baseboard management controller B2 by the inter-integrated circuit bus L1 ($I^2C$).

Please refer to step S5, wherein the first baseboard management controller B1 generates the corresponding operation according to the instruction. After the step S3, the first baseboard management controller B1 generates the corresponding operation according to the instruction and sends the result to the administration interface in a conventional condition (such as no bridge parameter in the instruction). Moreover, after the first baseboard management controller B1 sends said result, the process returns to the step S2 and waits for the next instruction sent to the first baseboard management controller B1.

Please refer to step S6, wherein the second baseboard management controller B2 generates the corresponding operation according to the instruction. After the step S4, the second baseboard management controller B2 performs the corresponding operation according to the instruction when the second baseboard management controller B2 receives the instruction from the inter-integrated circuit L1. Furthermore, the second baseboard management controller B2 encapsulates the result as the responding signal with the intelligent platform management interface (IPMB) data format, and sends the responding signal to the first baseboard management controller B1.

Please refer to step S7, wherein the first baseboard management controller B1 receives the responding signal and sending the responding signal to the administration interface. For the detailed description, the first baseboard management controller B1 sends the operation result generated by the second baseboard management controller B2 to the administration interface adapted for showing the operation result to the users. After the first baseboard management controller B1 sends the operation result, the process returns to the step S2 for waiting the next instruction sent to the first baseboard management controller B1.

As the description mentioned above, this present disclosure discloses the server system and the method for managing two baseboard management controllers. This present disclosure achieves the communication between the baseboard management controller of the display card and the baseboard management controller of the mainboard, and further achieving the purpose of managing the host and the display card simultaneously by the baseboard management controller of the mainboard. For these reasons, it is able to save half of the network source, and to decrease the layout of the computer facility and the cost for management.

The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A method for managing two baseboard management controllers, which is applied to a server system and the server system comprises a first baseboard management controller, a second baseboard management controller and a bus; wherein the first baseboard management controller electrically connects to the second baseboard management controller by the bus, and the method comprises:
    connecting to the first baseboard management controller by an administration interface;
    sending an instruction to the first baseboard management controller by the administration interface after connecting to the first baseboard management controller;
    determining whether the instruction comprises a bridge parameter by the first baseboard management controller;
    sending the instruction to the second baseboard management controller via the bus by the first baseboard management controller when the instruction comprises the bridge parameter, generating a responding signal according to the instruction by the second baseboard management controller, and receiving the responding signal and sending the responding signal to the administration interface by the first baseboard management controller; and
    the first baseboard management controller performs a corresponding operation according to the instruction when the instruction does not comprise a bridge parameter, and sending an operation result to the administration interface.

2. The method for managing two baseboard manage controllers according to claim 1, wherein the bus is a primary intelligent platform management interface bus.

3. The method for managing two baseboard manage controllers according to claim 1, wherein the administration interface connects to the first baseboard management controller by a local area network or a keyboard controller style.

4. The method for managing two baseboard manage controllers according to claim 1, wherein the administration interface is an intelligent platform management interface tool.

5. The method for managing two baseboard manage controllers according to claim 1, wherein the instruction further comprises an address of the second baseboard management controller when the instruction comprises the bridge parameter, and the address of the second baseboard management controller is different from another address of the first baseboard management controller.

* * * * *